(12) United States Patent
Chen

(10) Patent No.: US 10,531,301 B2
(45) Date of Patent: Jan. 7, 2020

(54) NETWORK ACCESS METHOD, APPARATUS, AND SYSTEM

(71) Applicant: Tencent Technology (Shenzhen) Company Limited, Shenzhen (CN)

(72) Inventor: Jiubiao Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 175 days.

(21) Appl. No.: 15/701,125

(22) Filed: Sep. 11, 2017

(65) Prior Publication Data

US 2018/0014199 A1    Jan. 11, 2018

Related U.S. Application Data

(63) Continuation-in-part of application No. PCT/CN2016/095566, filed on Aug. 16, 2016.

(30) Foreign Application Priority Data

Sep. 30, 2015 (CN) .......................... 2015 1 0642604

(51) Int. Cl.
*G06F 7/04* (2006.01)
*H04W 12/08* (2009.01)
*H04L 29/06* (2006.01)

(52) U.S. Cl.
CPC ......... *H04W 12/08* (2013.01); *H04L 63/0428* (2013.01)

(58) Field of Classification Search
None
See application file for complete search history.

(56) References Cited

U.S. PATENT DOCUMENTS 9,762,954 B2   9/2017 Gupta et al.
2012/0192258 A1*  7/2012 Spencer ................ H04W 12/06
  726/7

(Continued)

FOREIGN PATENT DOCUMENTS

CN      103068066 A    4/2013
CN      103716795 A    4/2014

(Continued)

OTHER PUBLICATIONS

Tencent Technology, ISRWO, PCT/CN2016/095566, dated Nov. 18, 2016, 8 pgs.

(Continued)

*Primary Examiner* — Brandon S Hoffman
(74) *Attorney, Agent, or Firm* — Morgan, Lewis & Bockius LLP

(57) ABSTRACT

The present disclosure discloses a network access method performed at a computer server in connection with a social networking platform, comprising: receiving a network access request from a first social networking account at a first terminal to a second social networking account at a second terminal, the network access request for accessing a wireless network bound to the second social networking account, the first and second social networking account both being associated with the social networking platform; forwarding the network access request to the second social networking account, the network access request including the first social networking account and an identifier of the wireless network; receiving a feedback instruction sent by the second social networking account; and sending authorization information of the wireless network to the first social networking account when the feedback instruction is an access authorization instruction, the authorization infor- (Continued)

mation including verification information used for accessing the wireless network.

17 Claims, 12 Drawing Sheets

(56) References Cited

U.S. PATENT DOCUMENTS

2013/0074159 A1* 3/2013 Lin .................. G06F 21/56
726/4
2013/0332987 A1* 12/2013 Tenneti ............ G06F 21/10
726/1

FOREIGN PATENT DOCUMENTS

| CN | 104285458 A | 1/2015 |
|----|----|----|
| CN | 104618346 A | 5/2015 |
| WO | WO 2013166999 A1 | 11/2013 |
| WO | WO 2015014383 A1 | 2/2015 |

OTHER PUBLICATIONS

Tencent Technology, IPRP, PCT/CN2016/095566, dated Apr. 3, 2018, 7 pgs.

* cited by examiner

NETWORK ACCESS METHOD, APPARATUS, AND SYSTEM

RELATED APPLICATIONS

This application is a continuation-in-part application of PCT/CN2016/095566, entitled "NETWORK ACCESS METHOD, APPARATUS, AND SYSTEM" filed on Aug. 16, 2016, which claims priority to Chinese Patent Application No. 201510642604.0, filed with the State Intellectual Property Office of the People's Republic of China on Sep. 30, 2015, and entitled "NETWORK ACCESS METHOD, APPARATUS, AND SYSTEM", both of which are incorporated herein by reference in their entirety.

FIELD OF THE TECHNOLOGY

Embodiments of the present disclosure relate to the technical field of communications, and in particular, to a network access method, apparatus, and system.

BACKGROUND OF THE DISCLOSURE

With wide use of mobile terminals, wireless networks have become a significant form for accessing the internet for the mobile terminals. The wireless network may be a wireless fidelity (WiFi) network.

In the existing technology, when accessing a wireless network, a mobile terminal needs to first acquire a Service Set Identifier (SSID) and a connection password of the wireless network and then send an access request to a wireless access point by using the SSID and the connection password. The wireless access point verifies the SSID and the connection password in the access request. After successfully verifying the SSID and the connection password, the wireless access point allows the mobile terminal to access the wireless network. The connection password is verification information when accessing the wireless network.

During the implementation of the present disclosure, the inventor has found existence of at least the following problem:

As a mobile terminal can successfully access a wireless network only after acquiring a connection password of the network and most wireless networks are encrypted wireless networks that are set privately, most of wireless networks that can be searched by the mobile terminal cannot be accessed given that connection passwords of the encrypted wireless networks are unknown.

SUMMARY

To resolve the problem of the existing technology, embodiments of the present disclosure provide a network access method, apparatus, and system. The technical solutions are as follows:

A first aspect of the embodiments of the present disclosure provides a network access method performed at a computer server in connection with a social networking platform, the method comprising: receiving a network access request that is sent by a first social networking account at a first terminal to a second social networking account at a second terminal, the network access request being used for requesting to access a wireless network bound to the second social networking account, wherein the first social networking account and the second social networking account are associated with the social networking platform; forwarding the network access request to the second social networking account, the network access request including the first social networking account and an identifier of the wireless network; receiving a feedback instruction sent by the second social networking account; and sending authorization information of the wireless network to the first social networking account in accordance with a determination that the feedback instruction is an access authorization instruction, the authorization information including verification information used for accessing the wireless network.

A second aspect of the embodiments of the present disclosure provides a computer server in connection with a social networking platform, the computer server having one or more processors, memory and one or more programs stored in the memory that, when executed by the one or more processors, cause the computer server to perform the aforementioned network access method.

A third aspect of the embodiments of the present disclosure provides a non-transitory computer readable storage medium storing one or more programs that, when executed by one or more processors of a computer server in connection with a social networking platform, cause the computer server to perform the aforementioned network access method.

Technical effects brought about by the technical solutions of the embodiments of the present disclosure are:

The server receives a network access request that is sent by the first social networking account to the second social networking account, a first social networking account logging in the first terminal, a second social networking account logging in the second terminal, and the network access request being used for requesting to access a wireless network bound to the second social networking account, forwards the network access request to the second terminal, receives a feedback instruction sent by the second terminal, and sends authorization information of the wireless network to the first terminal when the feedback instruction is an access authorization instruction, so that the first terminal accesses the wireless network according to the authorization information. The problem that most wireless networks are encrypted wireless networks that are set privately and most of wireless networks that can be searched by a mobile terminal cannot be accessed is resolved, thereby achieving the effect that a wireless network is bound to a second social networking account of an owner, and a requester sends, by means of a first social networking account, a network access request to the second social networking account of the owner that is or is not an acquaintance of the requester by using a social attribute of the social networking accounts, and accesses the wireless network when the owner authorizes the requester, so that the mobile terminal can access an encrypted wireless network that is set privately.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure more comprehensible, the following further describes embodiments of the present disclosure in detail with reference to the accompanying drawings.

Figure 1:
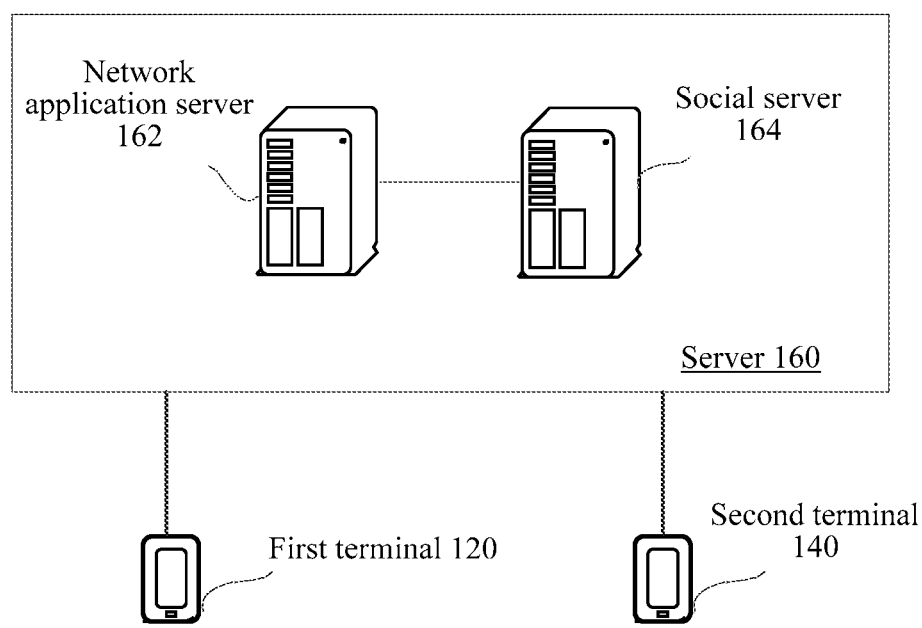
FIG. 1 is a schematic structural diagram of an implementation environment according to some embodiments of the present disclosure.

Referring to FIG. 1, FIG. 1 is a schematic structural diagram of a network access system according to some embodiments of the present disclosure. The network access system includes: a first terminal 120, a second terminal 140, and a server 160.

An installed application is run in the first terminal 120: for a first terminal (not shown), a first social networking account logs in the first terminal.

The first terminal 120 may be a mobile phone, a tablet computer, an ebook reader, a moving picture experts group audio layer III (MP3) player, a moving picture experts group audio layer IV (MP4) player, a laptop portable computer, a desktop computer, or the like. A communication application is installed in the first terminal 120. The communication application may be an instant messaging program, a social networking program, a video communication program, or an audio communication program. The communication application is an application having a text, audio and/or video communication capability in social interactions. For example, the communication application is an instant messaging program "Tencent QQ", a social networking program "Tencent weibo", an audio/video communication program "WeChat", or the like.

An installed application is run in the second terminal 140: for a second terminal (not shown), a second social networking account logs in the second terminal.

The second terminal 140 may be a mobile phone, a tablet computer, an ebook reader, a moving picture experts group audio layer III (MP3) player, a moving picture experts group audio layer IV (MP4) player, a laptop portable computer, a desktop computer, or the like. A communication application is installed in the second terminal 140. The communication application may be an instant messaging program, a social networking program, a video communication program, or an audio communication program. The communication application is an application having a text, audio and/or video communication capability in social interactions. For example, the communication application is an instant messaging program "Tencent QQ", a social networking program "Tencent weibo", an audio/video communication program "WeChat", or the like.

The first terminal 120 establishes a connection with the server 160 by means of a wireless network or a wired network. In some embodiments, information issued by the first terminal 120 is processed by the server 160 and is then sent to the second terminal 140.

In some embodiments, the second terminal 140 establishes a connection with the server 160 by means of a wireless network or a wired network. Information issued by the second terminal 140 is processed by the server 160 and is then sent to the first terminal 120.

In some embodiments, the server 160 is a backend server supporting the communication application such as a social networking platform. The server 160 may be one server or a server cluster or cloud computing center consisting of a plurality of servers.

In some embodiments, the server 160 includes a network application server 162 and a social networking server 164.

The first terminal 120 establishes a connection with the network application server 162 by means of a wireless network or a wired network. The network application server 162 is configured to store an identifier of the wireless network and authorization information of the wireless network. The authorization information is information used for accessing the wireless network, for example, key information and connection password. Meanwhile, the second terminal 140 establishes a connection with the network application server 162 by means of a wireless network or a wired network.

The first terminal 120 (or more specifically a first social networking account at the first terminal 120) establishes a connection with the social networking server 164 by means of a wireless network or a wired network. Meanwhile, the second terminal 140 (or more specifically a second social networking account at the second terminal 140) establishes a connection with the social networking server 164 by means of a wireless network or a wired network. The social networking server 164 is configured to process social networking information (e.g., text, audio, video messages) sent between the first terminal 120 and the second terminal 140 in the form of a chat room.

In some embodiments, there are three possible relationships between the first and second social networking accounts. First, there might be a direct contact relationship between the first and second social networking accounts. In this case, both the first and second social networking accounts are on each other's contact list and there is an existing one-to-one chat room between the two accounts. This usually happens between the two user accounts when their respective owners know each other quite well. Second, although there is no direct contact relationship between the first and second social networking accounts, both user accounts are participants of one or more group chats. In this case, the first and second social networking accounts are not on each other's contact list but they might have some mutual friends on the social networking platform. In other words, there is an indirect relationship between the two user accounts. Third, there is no relationship between the two user accounts, direct or indirect. As will be described below, the relationship between the two user accounts at the social networking platform may determine whether and how the wireless network is shared among users of the social networking platform.

Also, a connection is established between the network application server 162 and the social networking server 164 by means of a wireless network or a wired network.

In some embodiments, the wireless network or wired network uses standard communication technology and/or protocol. The network usually is the internet, but may alternatively be any network, which includes, but is not limited to, any combination of a local area network (LAN), a metropolitan area network (MAN), a wide area networks (WAN), a mobile, wired or wireless network, a private network, or a virtual private network. In some embodiments, the technology and/or format of Hypertext Markup Language (HTML), extensible Markup Language (XML), or the like is used to represent data exchanged through a network. In addition, all or some links may further be encrypted by using a conventional encryption technology such as Secure Sockets Layer (SSL), Transport Layer Security (TLS), Virtual Private Network (VPN), and Internet Protocol Security (IPsec). In some other embodiments, the foregoing data communication technology may alternatively be replaced by or supplemented to by using a customized and/or private data communication technology. It should be noted that the first terminal and the second terminal are clients of the same type, or the first terminal and the second terminal are clients of different types.

Figure 2:
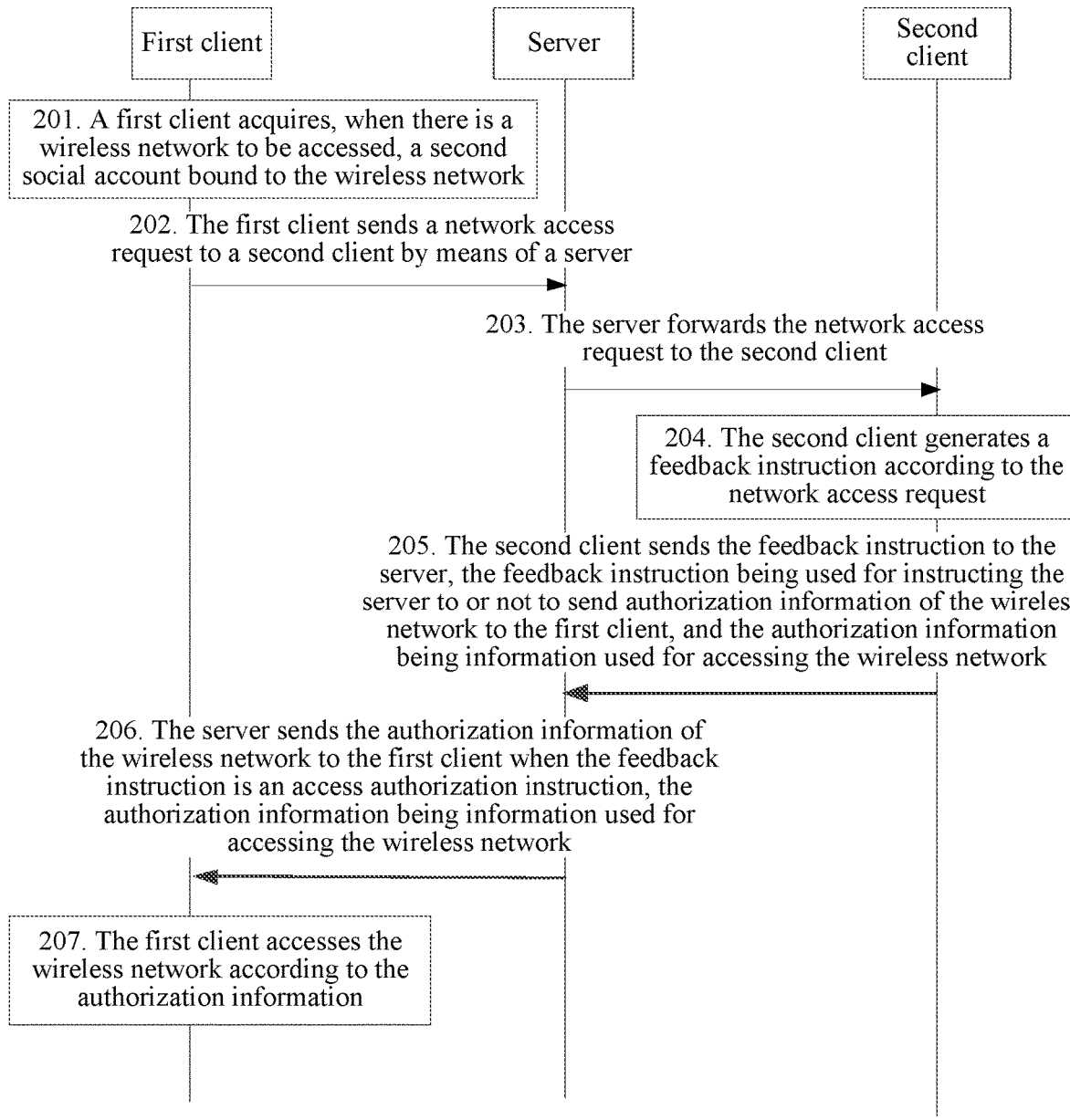
FIG. 2 is a method flowchart of a network access method according to some embodiments of the present disclosure.

Referring to FIG. 2, FIG. 2 is a method flowchart of a network access method according to some embodiments of the present disclosure. In this embodiment, the network access method being applied to the network access system shown in FIG. 1 is used as an example for describing. The method includes:

Operation 201: A first social networking account at a first terminal (or first client) acquires, when there is a wireless network to be accessed, a second social networking account bound to the wireless network.

Operation 202: The first terminal sends a network access request to the second terminal by means of a server. The second social networking account logs in the second terminal. The network access request is used for requesting to access the wireless network. In some embodiments, the network access request includes the first social networking account and an identifier of the wireless network to be accessed. For example, the user of the first terminal is visiting the house of the user of the second terminal for a party. Instead of asking the user of the second terminal for a password to access the wireless network at the house, the user can submit such network access request from his social networking account by entering the identifier of the wireless network and the social networking account of the user at the social networking platform. In some embodiments, the network access request includes a current location of the first terminal to uniquely identify the wireless network (e.g., using the GPS module in the first terminal).

Correspondingly, the server receives the network access request that is sent by the first social networking account to the second social networking account.

A first social networking account logs in the first terminal. The second social networking account logs in the second terminal. The network access request is used for requesting to access the wireless network bound to the second social networking account.

Operation 203: The server forwards the network access request to the second terminal. The server forwards the received network access request including the first social networking account and an identifier of the wireless network to the second terminal. Correspondingly, the second terminal receives the network access request sent by the server.

In some embodiments, before forwarding the network access request to the second social networking account, the computer server determines a relationship between the first social networking account and the second social networking account at the social networking platform. As noted above, there are at least three possible relationships between the two social networking accounts.

When the first social networking account is a direct contact of the second social networking account at the social networking platform, the computer server may deem that the first social networking account is reliable and then sends the authorization information of the wireless network to the first social networking account without waiting for the feedback instruction from the second social networking account. When the first social networking account and the second social networking account are not on each other's direct contact list but are members of a group chat at the social networking platform, the computer server may include an identity of the group chat and optionally the messages submitted by the first social networking account in the group chat in the network access request to be sent to the second social networking account. When reviewing the messages in the group chat associated with the first social networking account, the user of the second terminal can determine if the first social networking account should be granted access to the wireless network or not. When the first social networking account and the second social networking account are not members of any group chat at the social networking platform, the computer server may send a connection invitation to the second social networking account, the connection invitation including the first social networking account and the identifier of the wireless network. After sending the connection invitation to the second social networking account, the computer server may subsequently receive a response from the second social networking account, the response indicating that the second social networking account grants the network access request or not. If yes, the computer server first establishes a direct contact relationship between the first social networking account and the second social networking account at the social networking platform before granting the authorization information of the wireless network to the first social networking account. Note that a user of the social networking platform can configure its account as to what type of network access request needs what level of scrutiny before being granted access to a wireless network owned by the user.

Operation 204: The second terminal generates a feedback instruction according to the network access request.

Operation 205: The second terminal sends the feedback instruction to the server, the feedback instruction being used for instructing the server to or not to send authorization information of the wireless network to the first terminal, and the authorization information being information used for accessing the wireless network.

In some embodiments, the feedback instruction includes two types: an access authorization instruction and an access prohibition instruction. When allowing the first terminal to access the wireless network, the second terminal sends an access authorization instruction to the server. When prohibiting the first terminal from accessing the wireless network, the second terminal sends an access prohibition instruction to the server.

Correspondingly, the server receives the feedback instruction sent by the second terminal.

Operation 206: The server sends the authorization information of the wireless network to the first terminal when the feedback instruction is an access authorization instruction, the authorization information being information used for accessing the wireless network.

In some embodiments, the server sends the authorization information of the wireless network to the first terminal when the feedback instruction is an access authorization instruction, the authorization information being information used for accessing the wireless network.

In some embodiments, the authorization information carries a connection password of the wireless network or an access key of the wireless network.

In some embodiments, before receiving the network access request, the server first receives a binding instruction sent by the second social network account at the second terminal, the binding instruction carrying the second social networking account, the identifier of the wireless network, and the authorization information of the wireless network. Based on the binding instruction, the server binds the second social networking account, the identifier of the wireless network, and the authorization information of the wireless network according to the binding instruction. In some embodiments, the binding instruction further includes a location of the wireless network. Using the location of the wireless network and the location of the requesting first terminal, the server can deny a network access request in accordance with a determination that the location of the first terminal is outside a predefined range of the location of the wireless network.

In some embodiments, before sending the authorization information to the server, the second terminal encrypts the authorization information, so as to ensure security of the authorization information. Correspondingly, the first terminal receives the authorization information sent by the server. The authorization information is sent by the server when the feedback instruction of the second terminal is an access authorization instruction.

Operation 207: The first terminal accesses the wireless network according to the authorization information.

In some embodiments, the information carried in the authorization information is invisible to a user of the first terminal. The first terminal accesses the wireless network according to the authorization information.

In view of the above, by the network access method provided in the embodiments, the server receives a network access request that is sent by the first social networking account to the second social networking account, a first social networking account logging in the first terminal, a second social networking account logging in the second terminal, and the network access request being used for requesting to access a wireless network bound to the second social networking account, forwards the network access request to the second terminal, receives a feedback instruction sent by the second terminal, and sends authorization information of the wireless network to the first terminal when the feedback instruction is an access authorization instruction, so that the first terminal accesses the wireless network according to the authorization information. The problem that most wireless networks are encrypted wireless networks that are set privately and most of wireless networks that can be searched by a mobile terminal cannot be accessed is resolved, thereby achieving the effect that a wireless network is bound to a second social networking account of an owner, and a requester sends, by means of a first social networking account, a network access request to the second social networking account of the owner that is or is not an acquaintance of the requester by using a social attribute of the social networking accounts, and accesses the wireless network when the owner authorizes the requester, so that the mobile terminal can access an encrypted wireless network that is set privately.

Figure 3A:
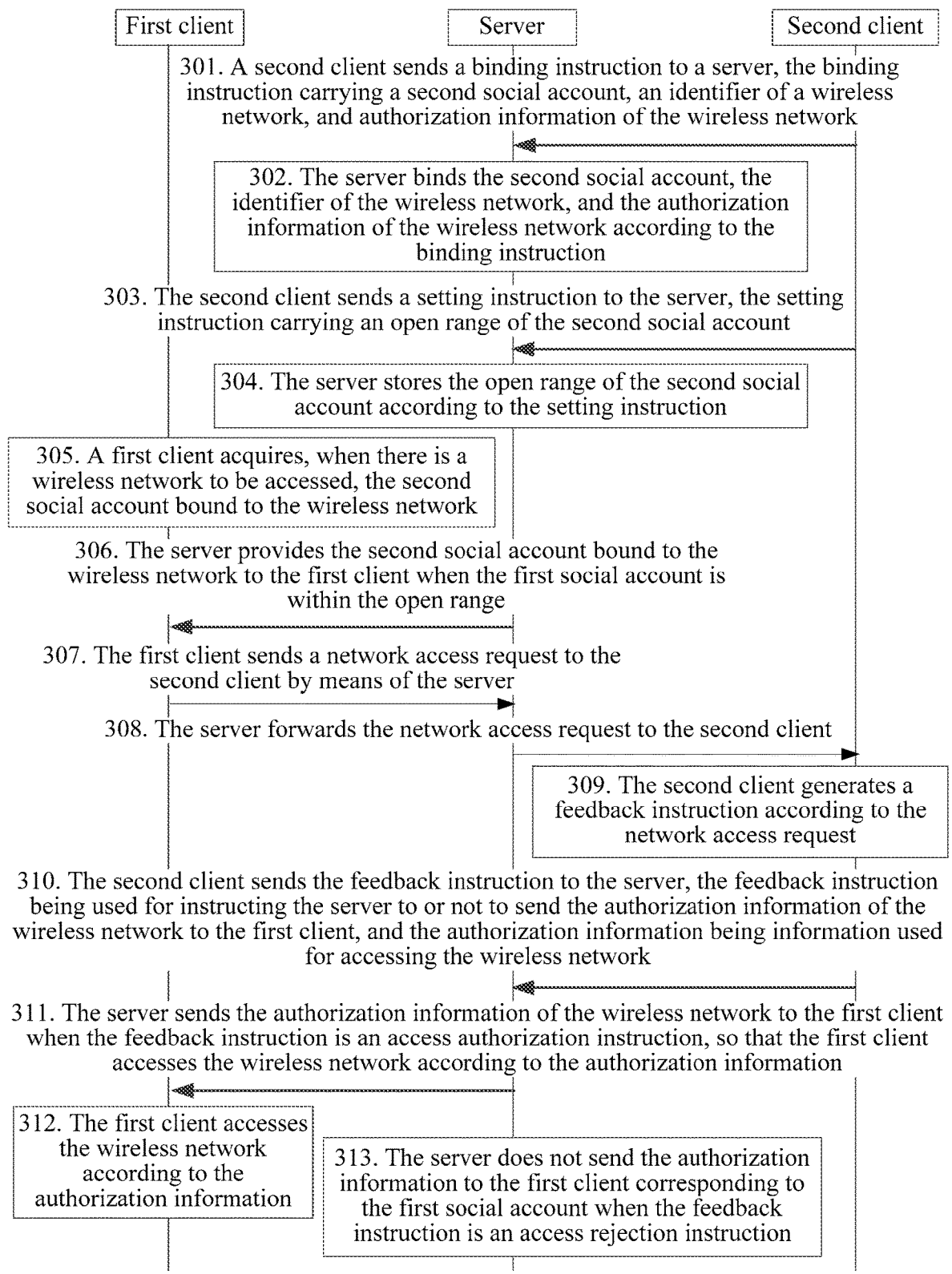
FIG. 3A is a method flowchart of a network access method according to another embodiment of the present disclosure.

Referring to FIG. 3A, FIG. 3A is a method flowchart of a network access method according to another embodiment of the present disclosure. In this embodiment, the network access method being applied to the network access system shown in FIG. 1 is used as an example for describing. The method includes:

Operation 301: A second terminal sends a binding instruction to a server, the binding instruction carrying a second social networking account, an identifier of a wireless network, and authorization information of the wireless network.

When the second terminal needs to bind the wireless network and the second social networking account for use, the second terminal first sends the binding instruction to the server. The binding instruction carries the second social networking account to be bound and the identifier of the wireless network. Meanwhile, the second terminal also adds the authorization information of the wireless network to the binding instruction for sending to the server.

Correspondingly, the server receives the binding instruction sent by the second social network account at the second terminal. The binding instruction carries the second social networking account, the identifier of the wireless network, and the authorization information of the wireless network.

Operation 302: The server binds the second social networking account, the identifier of the wireless network, and the authorization information of the wireless network according to the binding instruction.

After receiving the binding instruction, the server acquires the second social networking account and the identifier of the wireless network from the binding instruction, stores the authorization information of the wireless network, and binds the second social networking account and the wireless network.

Alternatively, after receiving the binding instruction, the server binds the second social networking account, the identifier of the wireless network, and the authorization information of the wireless network.

Operation 303: The second terminal sends a setting instruction to the server, the setting instruction carrying an open range of the second social networking account.

The open range includes: open to a selected social networking account, and/or, open to a social networking account having a predetermined attribute, and/or, open to a social networking account having a social relation, and/or, open to all social networking accounts.

In some embodiments, the open range of the second social networking account carried in the setting instruction is open to a selected social networking account. The selected social networking account is authorized to acquire the second social networking account corresponding to the wireless network when searching for a wireless network to be accessed.

For example, if the second social networking account determines social networking accounts in a contact group "friends and family" as selected social networking account, a social networking account in the contact group "friends and family" is authorized to acquire the second social networking account corresponding to the wireless network when finding the wireless network corresponding to the second social networking account. The selected social networking account and the second social networking account may be friends or may also be strangers.

In some embodiments, the open range of the second social networking account carried in the setting instruction is open to a social networking account having a predetermined attribute. A social networking account having the predetermined attribute is authorized to acquire the second social networking account corresponding to the wireless network when searching for a wireless network to be accessed. The predetermined attribute includes at least one attribute of gender, age, education, place, hobbies, and personal experience.

For example, if the second social networking account sets the predetermined attribute to be "gender: female, and age: 15 to 25", a social networking account having the attribute "gender: female, and age: 15 to 25" is authorized to acquire the second social networking account corresponding to the wireless network when finding the wireless network corresponding to the second social networking account.

In some embodiments, the open range of the second social networking account carried in the setting instruction is open to a social networking account having a social relation. A social networking account having the social relation is authorized to acquire the second social networking account corresponding to the wireless network when searching for a wireless network to be accessed. The social relation includes, but is not limited to, at least one of a friend relation, a follow relation, a relation of being in a same group. The social relation may be a one-way social relation, for example, a social networking account B follows a social networking account A, or may also be a two-way social relation, for example, a social networking account A sends a message to a social networking account B and the social networking account B sends a message to the social networking account A.

In some embodiments, the open range of the second social networking account carried in the setting instruction is open to all social networking accounts. A social networking account of any client is authorized to acquire the second social networking account corresponding to the wireless network when searching for a wireless network to be accessed.

Correspondingly, the server receives the setting instruction sent by the second terminal. The setting instruction carries the open range of the second social networking account.

Operation 304: The server stores the open range of the second social networking account according to the setting instruction.

After receiving the setting instruction sent by the second terminal, the server acquires the open range of the second social networking account carried in the setting instruction, and stores the open range of the second social networking account in the server, so as to check whether a first social networking account is within the open range of the second social networking account when the first social networking account requests to acquire the second social networking account.

Operation 305: A first terminal acquires, when there is a wireless network to be accessed, the second social networking account bound to the wireless network.

The first terminal searches for a wireless network in the surroundings, and screens according to the search result to select a wireless network to be accessed. According to information presented by the wireless network to be accessed, the first terminal acquires, by means of the server, the second social networking account bound to the wireless network.

Figure 3B:
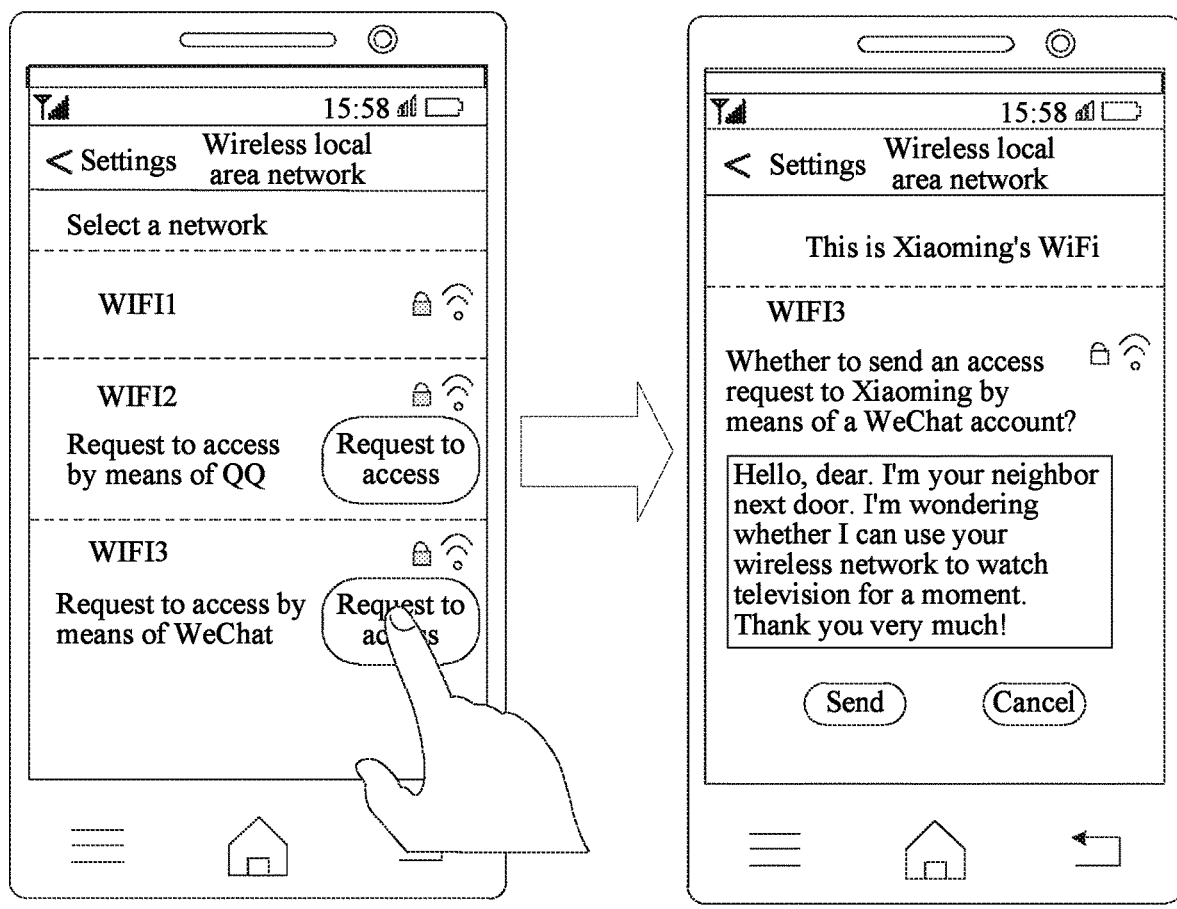
FIG. 3B is a schematic interface diagram of binding a social networking account and an identifier of a wireless network according to some embodiments of the present disclosure.

For example, the first terminal finds three wireless networks to be accessed: WIFI1, WIFI2, and WIFI3 within a predetermined range. Locking information is presented at a corresponding position of each of the three wireless networks to be accessed. However, a corresponding position of the wireless network WIFI2 further presents information of "Request to access by means of QQ", and a corresponding position of the wireless network WIFI3 further presents information of "Request to access by means of WeChat". The second social networking accounts corresponding to the wireless networks can be acquired by tapping "Request to access" at corresponding positions of the wireless networks WIFI2 and WIFI3, as shown in FIG. 3B.

QQ and WeChat are two different communication applications.

Operation 306: The server provides the second social networking account bound to the wireless network to the first terminal when the first social networking account is within the open range.

In some embodiments, the open range is an open range set by the second social networking account bound to the wireless network.

The open range includes: open to a selected social networking account, or, open to a social networking account having a predetermined attribute, or, open to a social networking account having a social relation, or, open to all social networking accounts.

Operation 307: The first terminal sends a network access request to the second terminal by means of the server.

The second social networking account logs in the second terminal. The network access request is used for requesting to access the wireless network.

After acquiring the second social networking account, the first terminal sends, by means of the server, a network access request to the second terminal by using the first social networking account that logs in the first terminal.

The network access request carries a portrait of the first social networking account, and/or, request information sent by the first social networking account.

For example, after acquiring the second social networking account at the corresponding position of the wireless network WIFI2, the first terminal sends, by means of the server, information of "Hello, dear. I'm your neighbor next door. I'm wondering whether I can use your wireless network to watch television for a moment. Thank you very much!" to the second social networking account, as shown in FIG. 3B.

It should be noted that the text in the foregoing information is self-defined and edited by a user of the first terminal, or the text in the foregoing information is automatically generated by the server.

Correspondingly, the server receives the network access request that is sent by the first social networking account to the second social networking account.

Operation 308: The server forwards the network access request to the second terminal.

The server forwards the received network access request to the second terminal.

Correspondingly, the second terminal receives the network access request sent by the server.

Operation 309: The second terminal generates a feedback instruction according to the network access request.

Tractably, the network access request carries the portrait of the first social networking account, and/or, the request information sent by the first terminal.

The second terminal receives the network access request forwarded by the server, acquires information in the network access request, and generates a corresponding feedback instruction according to the information in the network access request.

Figure 3C:
FIG. 3C is a schematic interface diagram of receiving a network access request by a social networking account according to some embodiments of the present disclosure.

For example, if the second terminal is the second social networking account bound to the wireless network WIFI2, the information of the network access request received by the second social networking account that logs in the second terminal is: "Hello, dear. I'm your neighbor next door. I'm wondering whether I can use your wireless network to watch television for a moment. Thank you very much!" and the portrait corresponding to the first social networking account, as shown in FIG. 3C.

In some embodiments, the feedback instruction includes two types: an access authorization instruction and an access prohibition instruction. When allowing the first terminal to access the wireless network, the second terminal sends an access authorization instruction to the server. When prohibiting the first terminal from accessing the wireless network, the second terminal sends an access prohibition instruction to the server.

In some embodiments, the second social networking account generates a corresponding feedback instruction according to the portrait corresponding to the first social networking account.

After the second social networking account receives the network access request sent by the first social networking account, if a user corresponding to the second social networking account particularly likes the portrait of the first social networking account and allows the user corresponding to the first social networking account to use the wireless network of the user corresponding to the second social networking account, the second social networking account generates an access authorization instruction.

In some embodiments, the second social networking account generates a corresponding feedback instruction according to information sent by the first social networking account.

After the second social networking account receives the network access request sent by the first social networking account, if the user corresponding to the second social networking account finds that the request information sent by the first social networking account is quite sincere, is moved by the request information sent by the first social networking account, and allows the user corresponding to the first social networking account to use the wireless network of the user corresponding to the second social networking account, the second social networking account generates an access authorization instruction.

In some embodiments, the second social networking account generates a corresponding feedback instruction according to both the portrait corresponding to the first social networking account and the information sent by the first social networking account.

After the second social networking account receives the network access request sent by the first social networking account, if the user corresponding to the second social networking account is at a bad mood and readily reject the network access request of the first social networking account when seeing the request information sent by the first social networking account, the second social networking account generates an access prohibition instruction.

In some embodiments, the access authorization instruction may further carry an authorization time and the number of authorizations. In some embodiments, the access prohibition instruction may further carry a prohibition reason.

Operation 310: The second terminal sends the feedback instruction to the server, the feedback instruction being used for instructing the server to or not to send authorization information of the wireless network to the first terminal, and the authorization information being information used for accessing the wireless network.

The second terminal sends the feedback instruction to the server.

In some embodiments, before sending the authorization information to the server, the second terminal encrypts the authorization information, so as to avoid theft of the authorization information in the transmission process.

In some embodiments, the authorization information carries a connection password of the wireless network or access information of connection to the wireless network.

In some embodiments, the authorization information further carries an authorization time and the number of authorizations.

Correspondingly, the server receives the feedback instruction sent by the second terminal.

Operation 311: The server sends the authorization information of the wireless network to the first terminal when the feedback instruction is an access authorization instruction, so that the first terminal accesses the wireless network according to the authorization information.

After receiving the feedback instruction sent by the second terminal, the server acquires information in the feedback instruction. If the feedback instruction is an access authorization instruction, the server acquires the stored authorization information and sends the authorization information of the wireless network to the first terminal corresponding to the first social networking account.

Correspondingly, the first terminal receives the authorization information sent by the server. The authorization information is sent by the server when the feedback instruction of the second terminal is an access authorization instruction.

Operation 312: The first terminal accesses the wireless network according to the authorization information.

The first terminal accesses the wireless network according to the authorization information sent by the server. In some embodiments, the information carried in the authorization information is invisible to a user of the first terminal, and from the perspective of the user, the first terminal is automatically connected to the wireless network.

The first terminal acquires, according to the authorization time and the number of authorizations carried in the authorization information, a time of this access to the wireless network, or the number of times for which the first terminal can access the wireless network. The first terminal accesses the wireless network according to the duration defined by the authorization time, or the first terminal accesses the wireless network according to the times defined by the number of authorizations.

Operation 313: The server does not send the authorization information to the first terminal corresponding to the first social networking account when the feedback instruction is an access rejection instruction.

After receiving the feedback instruction sent by the second terminal, the server acquires information in the feedback instruction. If the feedback instruction is an access rejection instruction, the server does not send the authorization information to the first terminal corresponding to the first social networking account.

In some embodiments, the server sends prompt information to the first social networking account. The prompt information is used for prompting that the first social networking account is not authorized by the second social networking account.

In view of the above, by the network access method provided in the embodiments, the server receives a network access request that is sent by the first social networking account to the second social networking account, a first social networking account logging in the first terminal, a second social networking account logging in the second terminal, and the network access request being used for requesting to access a wireless network bound to the second social networking account, forwards the network access request to the second terminal, receives a feedback instruction sent by the second terminal, and sends authorization information of the wireless network to the first terminal when the feedback instruction is an access authorization instruction, so that the first terminal accesses the wireless network according to the authorization information. The problem that most wireless networks are encrypted wireless networks that are set privately and most of wireless networks that can be searched by a mobile terminal cannot be accessed is resolved, thereby achieving the effect that a wireless network is bound to a second social networking account of an owner, and a requester sends, by means of a first social networking account, a network access request to the second social networking account of the owner that is or is not an acquaintance of the requester by using a social attribute of the social networking accounts, and accesses the wireless network when the owner authorizes the requester, so that the mobile terminal can access an encrypted wireless network that is set privately.

Figure 4A:
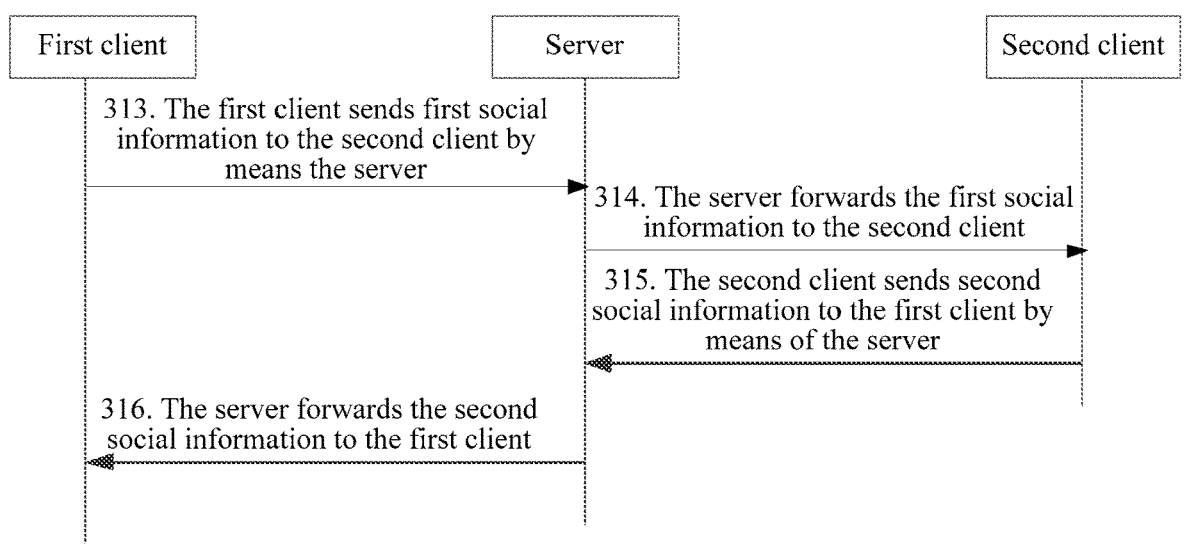
FIG. 4A is a flowchart of a method for sending information between social networking accounts according to some embodiments of the present disclosure.

In the network access method provided in the embodiment of FIG. 3A, the first terminal sends, by means of the server, a network access request to the second terminal only once, and there is no other interactions between the first terminal and the second terminal. As an embodiment provided based on FIG. 3A, after the first terminal acquires the second social networking account, another interaction behavior may be carried out between the first terminal and the second social networking account. Refer to the following operations, as shown in FIG. 4A:

Operation 313: The first terminal sends first social networking information to the second terminal by means the server.

After acquiring the second social networking account, the first terminal sends, by means of the server, the first social networking information to the second social networking account that logs in the second terminal.

The first social networking information is a second network access request that is sent by the first terminal to the second social networking account by means of the server, or chat information that is sent by the first terminal to the second social networking account by means of the server, or a friend adding request that is sent by the first terminal to the second social networking account by means of the server.

Correspondingly, the server receives the first social networking information that is sent by the first social networking account to the second social networking account.

Operation 314: The server forwards the first social networking information to the second terminal.

The server forwards to the second terminal the first social networking information sent by the first terminal.

Correspondingly, the second terminal receives the first social networking information that is sent by the first terminal by means of the server.

Operation 315: The second terminal sends second social networking information to the first terminal by means of the server.

After receiving the network access request sent by the first terminal by means of the server, the second terminal acquires the first social networking account carried in the network access request. The second terminal corresponding to the second social networking account sends, by means of the server, the second social networking information to the first terminal corresponding to the first social networking account.

The second social networking information is chat information that is sent by the second terminal to the first social networking account by means of the server, or a friend adding request that is sent by the second terminal to the first social networking account by means of the server.

Correspondingly, the server receives the second social networking information that is sent by the second social networking account to the first social networking account.

Operation 316: The server forwards the second social networking information to the first terminal.

The server forwards to the first terminal the second social networking information sent by the second terminal.

Correspondingly, the first terminal receives the second social networking information that is sent by the second terminal by means of the server.

The sequential order of operation 313 to operation 316 in this embodiment and operation 309 to operation 312 in the embodiment of FIG. 3A is not specifically defined.

In some embodiments, the types of the social networking information may further include: other types of information such as sending a red packet, sending a virtual gift, and requesting to follow.

In view of the above, by the network access method provided in this embodiment, an interaction behavior can be created between two social networking accounts which are primarily strangers based on a wireless network as an intermediate medium, the probability at which the first social networking account and the second social networking account meet each other as friends is increased, and a new way of adding friends is provided.

Figure 4B:
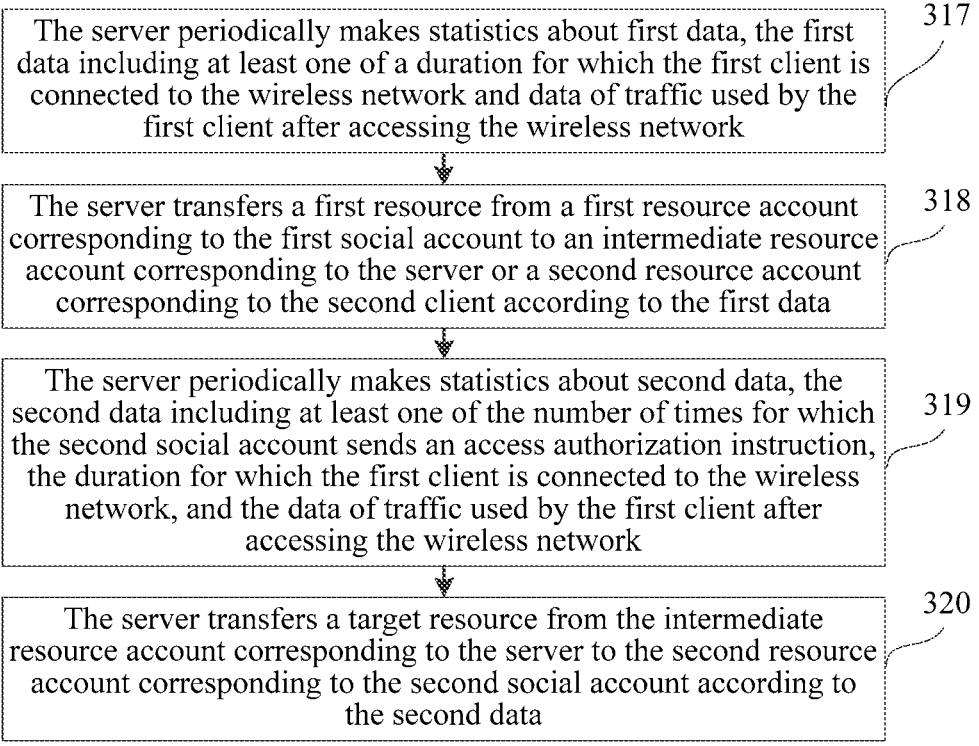
FIG. 4B is a flowchart of a method for data statistics and resource acquisition according to some embodiments of the present disclosure.

Based on the network access method provided by the embodiment in FIG. 3A, the first terminal sends, by means of the server, the network access request to the second social networking account and then accesses the wireless network, and a particular amount of use fees needs to be charged when the first terminal uses the wireless network. Refer to the following operations, as shown in FIG. 4B:

Operation 317: The server periodically makes statistics about first data, the first data including at least one of a duration for which the first terminal is connected to the wireless network and data of traffic used by the first terminal after accessing the wireless network.

In some embodiments, the server makes statistics about the duration for which the first terminal is connected to the wireless network at predetermined time intervals.

In some embodiments, the server makes statistics about the data of traffic used by the first terminal after accessing the wireless network at predetermined time intervals.

In some embodiments, the server makes statistics about the duration for which the first terminal is connected to the wireless network and the data of traffic used by the first terminal after accessing the wireless network at predetermined time intervals.

Operation 318: The server transfers a first resource from a first resource account corresponding to the first social networking account to an intermediate resource account corresponding to the server or a second resource account corresponding to the second terminal according to the first data.

In some embodiments, the server transfers the first resource from the first resource account corresponding to the first social networking account to the intermediate resource account corresponding to the server according to the duration for which the first terminal is connected to the wireless network.

In some embodiments, the server transfers the first resource from the first resource account corresponding to the first social networking account to the intermediate resource account corresponding to the server according to the data of traffic used by the first terminal after accessing the wireless network.

In some embodiments, the server transfers a first resource that has a relatively low cost for resources from the first resource account corresponding to the first social networking account to the intermediate resource account corresponding to the server according to the duration for which the first terminal is connected to the wireless network and the data of traffic used by the first terminal after accessing the wireless network. The cost for resources is obtained by calculating the duration of connection to the wireless network, or is obtained by calculation the data of traffic used after accessing the wireless network.

In some embodiments, the server transfers the first resource from the first resource account corresponding to the first social networking account to the second resource account corresponding to the second terminal according to the duration for which the first terminal is connected to the wireless network. In this case, forwarding by means of the intermediate resource account of the server is not required.

Operation 319: The server periodically makes statistics about second data, the second data including at least one of the number of times for which the second social networking account sends an access authorization instruction, the duration for which the first terminal is connected to the wireless network, and the data of traffic used by the first terminal after accessing the wireless network.

In some embodiments, the server makes statistics about the number of times for which the second social networking account sends an access authorization instruction at predetermined time intervals.

In some embodiments, the server makes statistics about the duration for which the first terminal is connected to the wireless network at predetermined time intervals. In some embodiments, for each wireless network of the second social networking account, the server makes statistics about the total duration for which all first terminals is connected to the wireless network at predetermined time intervals.

In some embodiments, the server makes statistics about the data of traffic used by the first terminal after accessing the wireless network at predetermined time intervals. For each wireless network of the second social networking account, the server makes statistics about the total data of traffic used by all the first terminals after accessing the wireless network at predetermined time intervals.

Operation 320: The server transfers a target resource from the intermediate resource account corresponding to the server to the second resource account corresponding to the second social networking account according to the second data.

In some embodiments, the server transfers the target resource from the intermediate resource account corresponding to the server to the second resource account corresponding to the second social networking account according to the number of times for which the second social networking account sends an access authorization instruction.

In some embodiments, the server transfers the target resource from the intermediate resource account corresponding to the server to the second resource account corresponding to the second social networking account according to the duration for which the first terminal is connected to the wireless network.

In some embodiments, the server transfers the target resource from the intermediate resource account corresponding to the server to the second resource account corresponding to the second social networking account according to the data of traffic used by the first terminal after accessing the wireless network.

The network access method provided by the embodiment in FIG. 2 and the embodiment in FIG. 3A is performed in one server. The network access method may alternatively be performed in a plurality of servers. Refer to the following embodiments.

Figure 5:
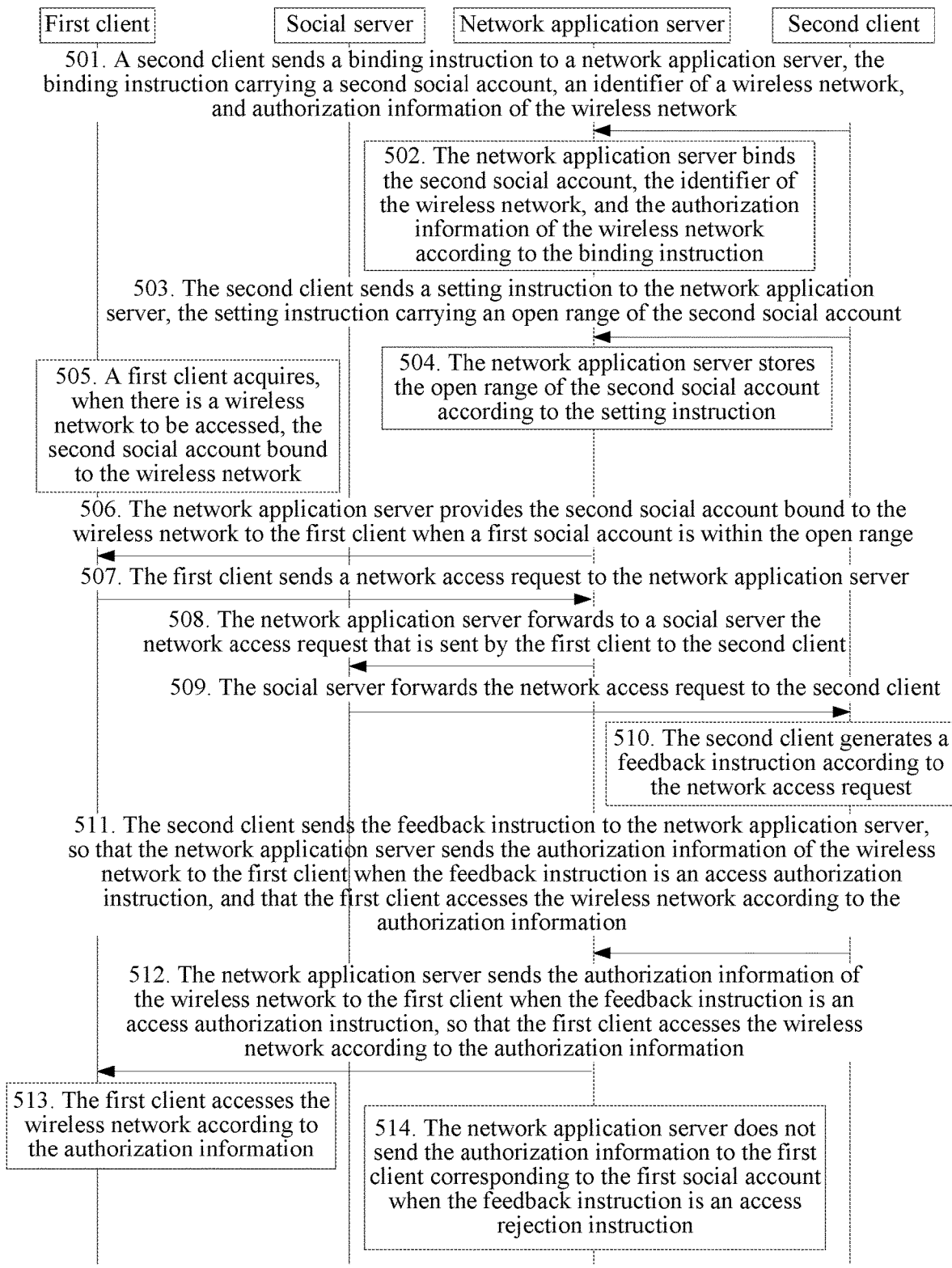
FIG. 5 is a method flowchart of a network access method according to another embodiment of the present disclosure.

Referring to FIG. 5, FIG. 5 is a method flowchart of a network access method according to another embodiment of the present disclosure. In this embodiment, the network access method being applied to the implementation environment shown in FIG. 1 is used as an example for describing. The method includes:

Operation 501: A second terminal sends a binding instruction to a network application server, the binding instruction carrying a second social networking account, an identifier of a wireless network, and authorization information of the wireless network.

When the second terminal needs to bind the wireless network and the second social networking account for use, the second terminal first sends the binding instruction to the network application server. The binding instruction carries the second social networking account to be bound and the identifier of the wireless network. Meanwhile, the second terminal also adds the authorization information of the wireless network to the binding instruction for sending to the network application server.

Correspondingly, the network application server receives the binding instruction sent by the second social network account at the second terminal. The binding instruction carries the second social networking account, the identifier of the wireless network, and the authorization information of the wireless network.

Operation 502: The network application server binds the second social networking account, the identifier of the wireless network, and the authorization information of the wireless network according to the binding instruction.

After receiving the binding instruction, the network application server acquires the second social networking account and the identifier of the wireless network from the binding instruction, stores the authorization information of the wireless network, and binds the second social networking account and the wireless network.

Alternatively, after receiving the binding instruction, the network application server binds the second social networking account, the identifier of the wireless network, and the authorization information of the wireless network.

Operation 503: The second terminal sends a setting instruction to the network application server, the setting instruction carrying an open range of the second social networking account.

The open range includes: open to a selected social networking account, and/or, open to a social networking account having a predetermined attribute, and/or, open to a social networking account having a social relation, and/or, open to all social networking accounts.

In some embodiments, the open range of the second social networking account carried in the setting instruction is open to a selected social networking account. The selected social networking account is authorized to acquire the second social networking account corresponding to the wireless network when searching for a wireless network to be accessed.

In some embodiments, the open range of the second social networking account carried in the setting instruction is open to a social networking account having a predetermined attribute. A social networking account having the predetermined attribute is authorized to acquire the second social networking account corresponding to the wireless network when searching for a wireless network to be accessed. The predetermined attribute includes at least one attribute of gender, age, education, place, hobbies, and personal experience.

In some embodiments, the open range of the second social networking account carried in the setting instruction is open to a social networking account having a social relation. A social networking account having the social relation is authorized to acquire the second social networking account corresponding to the wireless network when searching for a wireless network to be accessed. The social relation includes, but is not limited to, at least one of a friend relation, a follow relation, a relation of being in a same group. The social relation may be a one-way social relation, for example, a social networking account B follows a social networking account A, or may also be a two-way social relation, for example, a social networking account A sends a message to a social networking account B and the social networking account B sends a message to the social networking account A.

In some embodiments, the open range of the second social networking account carried in the setting instruction is open to all social networking accounts. A social networking account of any client is authorized to acquire the second social networking account corresponding to the wireless network when searching for a wireless network to be accessed.

Correspondingly, the server receives the setting instruction sent by the second terminal. The setting instruction carries the open range of the second social networking account.

Operation 504: The network application server stores the open range of the second social networking account according to the setting instruction.

After receiving the setting instruction sent by the second terminal, the network application server acquires the open range of the second social networking account carried in the setting instruction, and stores the open range of the second social networking account in the network application server, so as to check whether a first social networking account is within the open range of the second social networking account when the first social networking account requests to acquire the second social networking account.

Operation 505: A first terminal acquires, when there is a wireless network to be accessed, the second social networking account bound to the wireless network.

The first terminal searches for a wireless network in the surroundings, and screens according to the search result to select a wireless network to be accessed. According to information presented by the wireless network to be accessed, the first terminal acquires, by means of the network application server, the second social networking account bound to the wireless network.

For example, the first terminal finds three wireless networks to be accessed: WIFI1, WIFI2, and WIFI3 within a predetermined range. Locking information is presented at a corresponding position of each of the three wireless networks to be accessed. However, a corresponding position of the wireless network WIFI2 further presents information of "Request to access by means of QQ", and a corresponding position of the wireless network WIFI3 further presents information of "Request to access by means of WeChat". The second social networking accounts corresponding to the wireless networks can be acquired by tapping "Request to access" at corresponding positions of the wireless networks WIFI2 and WIFI3.

Operation 506: The network application server provides the second social networking account bound to the wireless network to the first terminal when a first social networking account is within the open range.

In some embodiments, the open range is an open range set by the second social networking account bound to the wireless network.

The open range includes: open to a selected social networking account, or, open to a social networking account having a predetermined attribute, or, open to a social networking account having a social relation, or, open to all social networking accounts.

Operation 507: The first terminal sends a network access request to the network application server.

Operation 508: The network application server forwards to a social server the network access request that is sent by the first social networking account to the second social networking account.

After receiving the network access request that is sent by the first social networking account to the second social networking account, the network application server forwards the network access request to the social server, and the social server sends the network access request to the second terminal.

Correspondingly, the social server receives the network access request forwarded by the network application server.

Operation 509: The social server forwards the network access request to the second terminal.

The social server forwards the received network access request to the second terminal.

Correspondingly, the second terminal receives the network access request sent by the social server.

Operation 510: The second terminal generates a feedback instruction according to the network access request.

The network access request carries a portrait of the first social networking account, and/or, the request information sent by the first terminal.

The second terminal receives the network access request forwarded by the social server, acquires information in the network access request, and generates a corresponding feedback instruction according to the information in the network access request.

Operation 511: The second terminal sends the feedback instruction to the network application server, so that the network application server sends the authorization information of the wireless network to the first terminal when the feedback instruction is an access authorization instruction, and that the first terminal accesses the wireless network according to the authorization information.

Operation 512: The network application server sends the authorization information of the wireless network to the first terminal when the feedback instruction is an access authorization instruction, so that the first terminal accesses the wireless network according to the authorization information.

After receiving the feedback instruction sent by the second terminal, the network application server acquires information in the feedback instruction. If the feedback instruction is an access authorization instruction, the network application server acquires the stored authorization information and sends the authorization information of the wireless network to the first terminal corresponding to the first social networking account.

Correspondingly, the first terminal receives the authorization information sent by the network application server. The authorization information is sent by the network application server when the feedback instruction of the second terminal is an access authorization instruction.

Operation 513: The first terminal accesses the wireless network according to the authorization information.

The first terminal accesses the wireless network according to the authorization information sent by the network application server.

Operation 514: The network application server does not send the authorization information to the first terminal corresponding to the first social networking account when the feedback instruction is an access rejection instruction.

After receiving the feedback instruction sent by the second terminal, the server acquires information in the feedback instruction. If the feedback instruction is an access rejection instruction, the server does not send the authorization information to the first terminal corresponding to the first social networking account.

In some embodiments, the server sends prompt information to the first social networking account. The prompt information is used for prompting that the first social networking account is not authorized by the second social networking account.

The following are apparatus embodiments of the present disclosure, content that is not detailed in the apparatus embodiments may refer to the method embodiments that are one-to-one corresponding to the apparatus embodiments.

Figure 6:
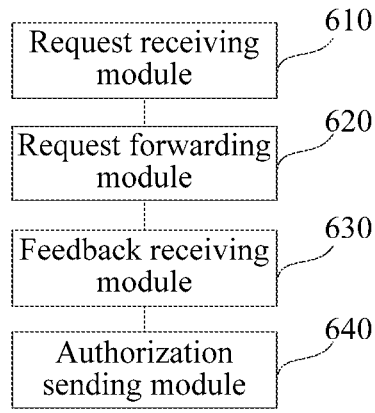
FIG. 6 is a structural block diagram of a network access apparatus according to some embodiments of the present disclosure.

Referring to FIG. 6, FIG. 6 is a structural block diagram of a network access apparatus according to some embodiments of the present disclosure. The network access apparatus provided in this embodiment may be implemented as the whole or a part of a server by means of software, hardware, or a combination of software and hardware. The apparatus includes:

a request receiving module 610, configured to receive a network access request that is sent by a first social networking account at a first terminal to a second social networking account at a second terminal, a first social networking account logging in the first terminal, a second social networking account logging in the second terminal, and the network access request being used for requesting to access a wireless network bound to the second social networking account;

a request forwarding module 620, configured to forward the network access request to the second terminal;

a feedback receiving module 630, configured to receive a feedback instruction sent by the second terminal; and an authorization sending module 640, configured to send authorization information of the wireless network to the first terminal when the feedback instruction is an access authorization instruction, the authorization information including verification information used for accessing the wireless network.

Figure 7:
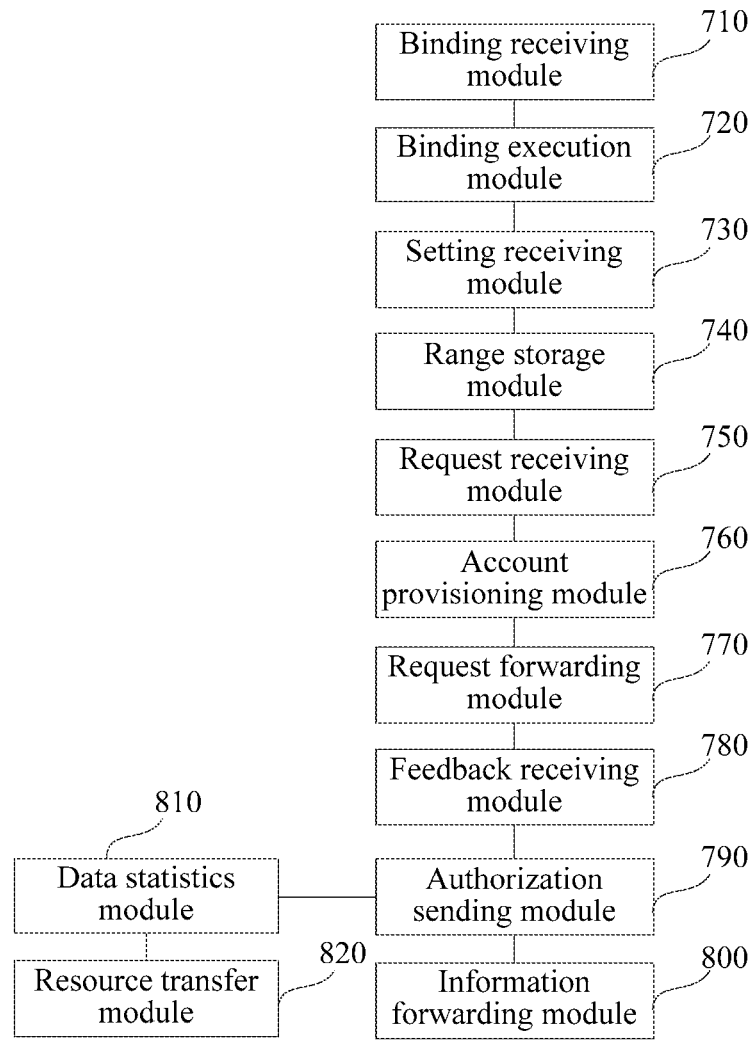
FIG. 7 is a structural block diagram of a network access apparatus according to another embodiment of the present disclosure.

Referring to FIG. 7, FIG. 7 is a structural block diagram of a network access apparatus according to another embodiment of the present disclosure. The network access apparatus provided in this embodiment may be implemented as the whole or a part of a server by means of software, hardware, or a combination of software and hardware. The apparatus includes:

a binding receiving module 710, configured to receive a binding instruction sent by a second terminal, the binding instruction carrying a second social networking account, an identifier of a wireless network, and authorization information of the wireless network;

a binding execution module 720, configured to bind the second social networking account, the identifier of the wireless network, and the authorization information of the wireless network according to the binding instruction;

a setting receiving module 730, configured to receive a setting instruction sent by the second terminal, the setting instruction carrying an open range of the second social networking account;

a range storage module 740, configured to store the open range of the second social networking account according to the setting instruction;

a request receiving module 750, configured to receive a network access request that is sent by a first terminal to the second terminal, a first social networking account logging in the first terminal, the second social networking account logging in the second terminal, and the network access request being used for requesting to access the wireless network bound to the second social networking account;

a account provisioning module 760, configured to provide the second social networking account bound to the wireless network to the first terminal when the first social networking account is within the open range, where the open range includes: open to a selected social networking account, or, open to a social networking account having a predetermined attribute, or, open to a social networking account having a social relation, or, open to all social networking accounts; and the predetermined attribute includes at least one attribute of gender, age, education, place, hobbies, and personal experience;

a request forwarding module 770, configured to forward the network access request to the second terminal;

a feedback receiving module 780, configured to receive a feedback instruction sent by the second terminal;

an authorization sending module 790, configured to send the authorization information of the wireless network to the first terminal when the feedback instruction is an access authorization instruction, the authorization information including verification information used for accessing the wireless network; and an information forwarding module 800, configured to receive first social networking information that is sent by the first social networking account to the second social networking account, and forward the first social networking information to the second terminal.

In some embodiments, the information forwarding module 800 is further configured to receive second social networking information that is sent by the second social networking account to the first social networking account, and forward the second social networking information to the first terminal.

In some embodiments, the data statistics module 810 is configured to periodically make statistics about first data, the first data including at least one of a duration for which the first terminal is connected to the wireless network and data of traffic used by the first terminal after accessing the wireless network. The resource transfer module 820 is configured to transfer a first resource from a first resource account corresponding to the first social networking account to a second resource account corresponding to the second social networking account according to the first data.

In some embodiments, the data statistics module 810 is configured to periodically make statistics about first data, the first data including at least one of a duration for which the first terminal is connected to the wireless network and data of traffic used by the first terminal after accessing the wireless network. The resource transfer module 820 is further configured to periodically makes statistics about second data, the second data including at least one of the number of times for which the second social networking account sends an access authorization instruction, the duration for which the first terminal is connected to the wireless network, and the data of traffic used by the first terminal after accessing the wireless network.

In some embodiments, the data statistics module 810 is configured to transfer a first resource from a first resource account corresponding to the first social networking account to an intermediate resource account corresponding to the server according to the first data. In some embodiments, the resource transfer module 820 is further configured to transfer a target resource from the intermediate resource account corresponding to the server to the second resource account corresponding to the second social networking account according to the second data.

Figure 8:
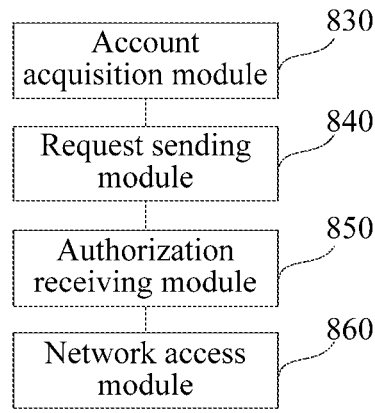
FIG. 8 is a structural block diagram of a network access apparatus according to some embodiments of the present disclosure.

Referring to FIG. 8, FIG. 8 is a structural block diagram of a network access apparatus according to some embodiments of the present disclosure. The network access apparatus provided in this embodiment may be implemented as the whole or a part of a first terminal or a first terminal by means of software, hardware, or a combination of software and hardware. The apparatus includes:

an account acquisition module 830, configured to acquire, when there is a wireless network to be accessed, a second social networking account bound to the wireless network;

a request sending module 840, configured to send a network access request to a second terminal by means of a server, the second social networking account logging in the second terminal, and the network access request being used for requesting to access the wireless network;

an authorization receiving module 850, configured to receive authorization information sent by the server, the authorization information being used for accessing; and a network access module 860, configured to access the wireless network according to the authorization information.

Figure 9:
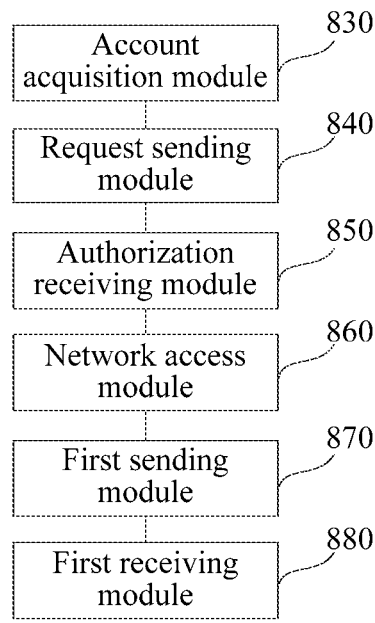
FIG. 9 is a structural block diagram of a network access apparatus according to another embodiment of the present disclosure.

Referring to FIG. 9, FIG. 9 is a structural block diagram of a network access apparatus according to another embodiment of the present disclosure. The network access apparatus provided in this embodiment may be implemented as the whole or a part of a first terminal, or the whole or a part of a first terminal, by means of software, hardware, or a combination of software and hardware. The apparatus includes:

an account acquisition module 830, configured to acquire, when there is a wireless network to be accessed, a second social networking account bound to the wireless network;

a request sending module 840, configured to send a network access request to a second terminal by means of a server, the second social networking account logging in the second terminal, and the network access request being used for requesting to access the wireless network;

an authorization receiving module 850, configured to receive authorization information sent by the server, the authorization information including verification information used for accessing the wireless network; and a network access module 860, configured to access the wireless network according to the authorization information.

In some embodiments, further included are a first sending module 870, configured to send, by means of the server, first social networking information to the second terminal; and a first receiving module 880, configured to receive second social networking information sent by the second terminal by means of the server.

Figure 10:
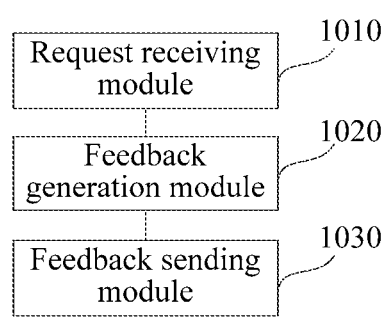
FIG. 10 is a structural block diagram of a network access apparatus according to some embodiments of the present disclosure.

Referring to FIG. 10, FIG. 10 is a structural block diagram of a network access apparatus according to some embodiments of the present disclosure. The network access apparatus provided in this embodiment may be implemented as the whole or a part of a second terminal, or the whole or a part of a first terminal, by means of software, hardware, or a combination of software and hardware. The apparatus includes:

a request receiving module 1010, configured to receive a network access request sent by a server, the network access request being sent by a first terminal to a second terminal, a first social networking account logging in the first terminal, a second social networking account logging in the second terminal, and the network access request being used for requesting to access a wireless network bound to the second social networking account;

a feedback generation module 1020, configured to generate a feedback instruction according to the network access request; and a feedback sending module 1030, configured to send the feedback instruction to the server, the feedback instruction being used for instructing the server to or not to send authorization information of the wireless network to the first terminal, and the authorization information being information used for accessing the wireless network.

Figure 11:
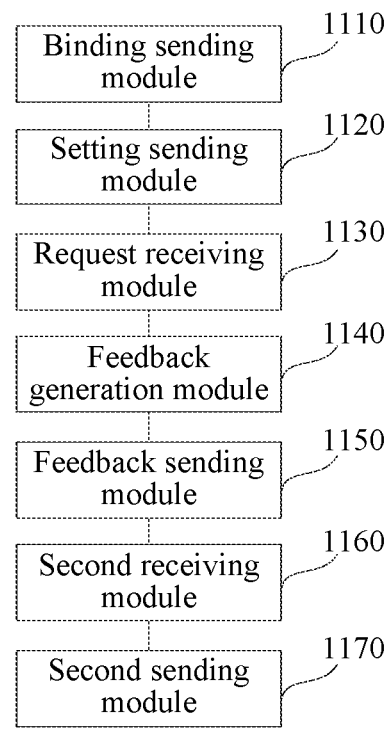
FIG. 11 is a structural block diagram of a network access apparatus according to another embodiment of the present disclosure.

Referring to FIG. 11, FIG. 11 is a structural block diagram of a network access apparatus according to another embodiment of the present disclosure. The network access apparatus provided in this embodiment may be implemented as the whole or a part of a second terminal, or the whole or a part of a first terminal, by means of software, hardware, or a combination of software and hardware. The apparatus includes:

a binding sending module 1110, configured to send a binding instruction to a server, the binding instruction carrying a second social networking account, an identifier of a wireless network, and authorization information of the wireless network;

a setting sending module 1120, configured to send a setting instruction to the server, the setting instruction carrying an open range of the second social networking account, wherein the open range includes: open to a selected social networking account, or, open to a social networking account having a predetermined attribute, or, open to a social networking account having a social relation, or, open to all social networking accounts; and the predetermined attribute includes at least one attribute of gender, age, education, place, hobbies, and personal experience;

a request receiving module 1130, configured to receive a network access request sent by the server, the network access request being sent by a first terminal to a second terminal, a first social networking account logging in the first terminal, the second social networking account logging in the second terminal, and the network access request being used for requesting to access a wireless network bound to the second social networking account;

a feedback generation module 1140, configured to generate a feedback instruction according to the network access request; and a feedback sending module 1150, configured to send the feedback instruction to the server, the feedback instruction being used for instructing the server to or not to send the authorization information of the wireless network to the first terminal, and the authorization information being information used for accessing the wireless network.

In some embodiments, further included are a second receiving module 1160, configured to receive first social networking information sent by the first terminal by means of the server; and a second sending module 1170, configured to send second social networking information to the first terminal by means of the server.

It should be noted that the above functional modules are only described for exemplary purposes when the network access apparatus accesses a network. In actual applications, the functions may be allocated to different functional modules according to specific needs, which means that the internal structure of the server and the terminal is divided to different functional modules to complete all or some of the above described functions. In addition, the network access apparatus provided by the foregoing embodiments are based on the same concept as the network access method in the foregoing embodiments. For the specific implementation process, refer to the method embodiments, and the details are not described herein again.

Figure 12:
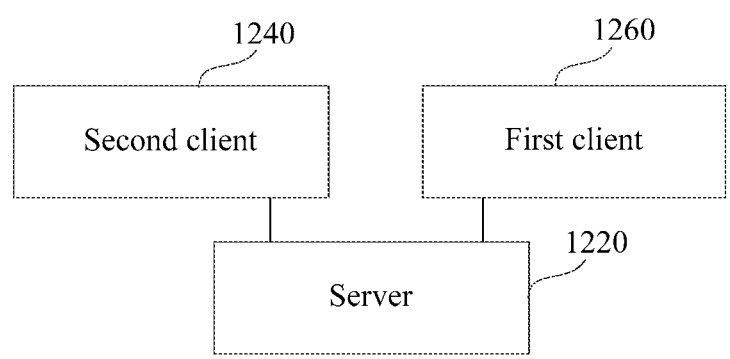
FIG. 12 is a structural block diagram of a network access system according to some embodiments of the present disclosure.

Referring to FIG. 12, FIG. 12 is a structural block diagram of a network access system according to some embodiments of the present disclosure. The system includes: a server 1220, a first terminal 1240, and a second terminal 1260.

The server 1220 includes the network access apparatus according to any one of the embodiment shown in FIG. 6 or the embodiment shown in FIG. 7.

The first terminal 1240 includes the network access apparatus according to any one of the embodiment shown in FIG. 8 or the embodiment shown in FIG. 9.

The second terminal 1260 includes the network access apparatus according to any one of the embodiment shown in FIG. 10 or the embodiment shown in FIG. 11.

Figure 13:
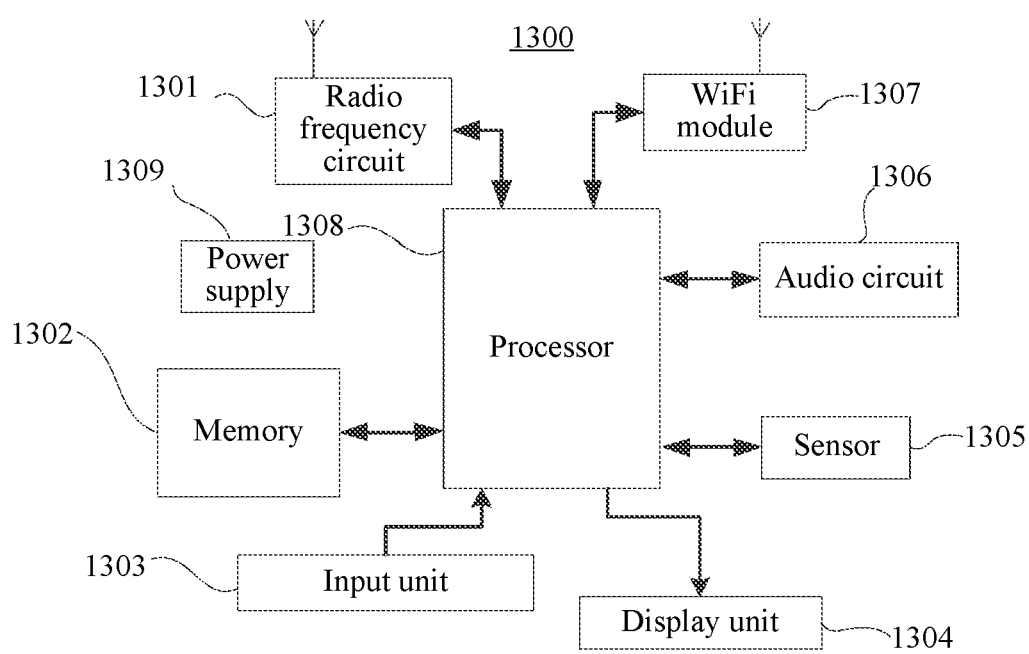
FIG. 13 is a structural block diagram of a terminal according to some embodiments of the present disclosure.

Referring to FIG. 13, FIG. 13 is a block diagram of a terminal 1300 according to some embodiments of the present disclosure. The terminal may include components such as a radio frequency (RF) circuit 1301, a memory 1302 including one or more non-transitory computer readable storage media, an input unit 1303, a display unit 1304, a sensor 1305, an audio circuit 1306, a wireless fidelity (WiFi) module 1307, a processor 1308 including one or more processing cores, and a power supply 1309. A person skilled in the art may understand that the structure of the terminal shown in FIG. 13 does not constitute a limitation to the terminal, and the terminal may include more components or fewer components than those shown in the figure, or some components may be combined, or a different component deployment may be used. The RF circuit and/or the WiFi may alternatively be collectively referred to as communication components.

The RF circuit 1301 may be configured to receive and send signals during an information receiving and sending process or a call process. Particularly, the RF circuit 1301 receives downlink information from a base station, then delivers the downlink information to the processor 1308 for processing, and sends related uplink data to the base station. Generally, the RF circuit 1301 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1301 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 1302 may be configured to store a software program and module. The processor 1308 runs the software program and module stored in the memory 1302, to implement various functional applications and data processing. The memory 1302 may mainly include a program storage area and a data storage area. The program storage area may store an operating system, an application program required by at least one function (such as a sound playback function and an image display function), and the like. The data storage area may store data (such as audio data and an address book) created according to use of the terminal, and the like. In addition, the memory 1302 may include a high speed random access memory, and may also include a nonvolatile memory such as at least one magnetic disk storage device, a flash memory, or another volatile solid-state storage device. Correspondingly, the memory 1302 may further include a memory controller, so as to provide access of the processor 1308 and the input unit 1303 to the memory 1302.

The input unit 1303 may be configured to receive input digit or character information, and generate a keyboard, mouse, joystick, optical, or track ball signal input related to the user setting and function control. Specifically, the input unit 1303 may include a touch-sensitive surface and another input device. The touch-sensitive surface, which may also be referred to as a touchscreen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. In some embodiments, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1308. Moreover, the touch controller can receive and execute a command sent from the processor 1308. In addition, the touch-sensitive surface may be may be a resistive, capacitive, infrared, or surface sound wave type touch-sensitive surface. In addition to the touch-sensitive surface, the input unit 1303 may further include the another input device. Specifically, the another input device may include, but is not limited to, one or more of a physical keyboard, a functional key (such as a volume control key or a switch key), a track ball, a mouse, and a joystick.

The display unit 1304 may be configured to display information input by the user or information provided for the user, and various graphical user interfaces of the terminal. The graphical user interfaces may be formed by a graph, a text, an icon, a video, or any combination thereof. The display unit 1304 may include a display panel. In some embodiments, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 1308, so as to determine the type of the touch event. Then, the processor 1308 provides a corresponding visual output on the display panel according to the type of the touch event. Although, in FIG. 13, the touch-sensitive surface and the display panel are used as two separate parts to implement input and output functions, in some embodiments, the touch-sensitive surface and the display panel may be integrated to implement the input and output functions.

The terminal may further include at least one sensor 1305, such as an optical sensor, a motion sensor, and other sensors. Specifically, the optical sensor may include an ambient light sensor and a proximity sensor. The ambient light sensor can adjust luminance of the display panel according to brightness of the ambient light. The proximity sensor may switch off the display panel and/or backlight when the terminal is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal, are not further described herein.

The audio circuit 1306, a speaker, and a microphone may provide audio interfaces between the user and the terminal. The audio circuit 1306 may convert received audio data into an electric signal and transmit the electric signal to the speaker. The speaker converts the electric signal into a sound signal for output. On the other hand, the microphone converts a collected sound signal into an electric signal. The audio circuit 1306 receives the electric signal and converts the electric signal into audio data, and outputs the audio data to the processor 1308 for processing. Then, the processor 1308 sends the audio data to, for example, another terminal by using the RF circuit 1301, or outputs the audio data to the memory 1302 for further processing. The audio circuit 1306 may further include an earplug jack, so as to provide communication between a peripheral earphone and the terminal.

WiFi is a short distance wireless transmission technology. The terminal may help, by using the WiFi module 1307, the user to receive and send emails, browse a web page, access streaming media, and so on, which provides wireless broadband internet access for the user. Although FIG. 5 shows the WiFi module 1307, it may be understood that the WiFi module 1307 is not a necessary component of the terminal, and when required, the WiFi module 1307 may be omitted as long as the scope of the essence of the present disclosure is not changed.

The processor 1308 is the control center of the terminal, and is connected to various parts of the mobile phone by using various interfaces and lines. By running or executing the software program and/or module stored in the memory 1302, and invoking data stored in the memory 1302, the processor 1308 performs various functions and data processing of the terminal, thereby performing overall monitoring on the mobile phone. In some embodiments, the processor 1308 may include one or more processing cores. Preferably, the processor 1308 may integrate an application processor and a modem. The application processor mainly processes an operating system, a user interface, an application program, and the like. The modem mainly processes wireless communication. It may be understood that the foregoing modem may either not be integrated into the processor 1308.

The terminal further includes the power supply 1309 (such as a battery) for supplying power to the components. Preferably, the power supply may be logically connected to the processor 1308 by using a power management system, thereby implementing functions such as charging, discharging and power consumption management by using the power management system. The power supply 1309 may further include one or more of a direct current or alternating current power supply, a re-charging system, a power failure detection circuit, a power supply converter or inverter, a power supply state indicator, and any other components.

Although not shown in the figure, the terminal may further include a camera, a Bluetooth module, and the like, which are not further described herein. Specifically, in this embodiment, the processor 1308 in the terminal may run the one or more program instructions stored in the memory 1302, so as to implement the operations performed by the first terminal or the second terminal in the network access method according to the foregoing method embodiments.

A person skilled in the art of ordinary skill in the art should understand that all or a part of the operations of the network access method in the foregoing embodiments may be implemented by a program instructing relevant hardware. The program may be stored in a non-transitory computer readable storage medium, such as a read only memory (ROM), a random access memory (RAM), a magnetic disk, or an optical disc.

Figure 14:
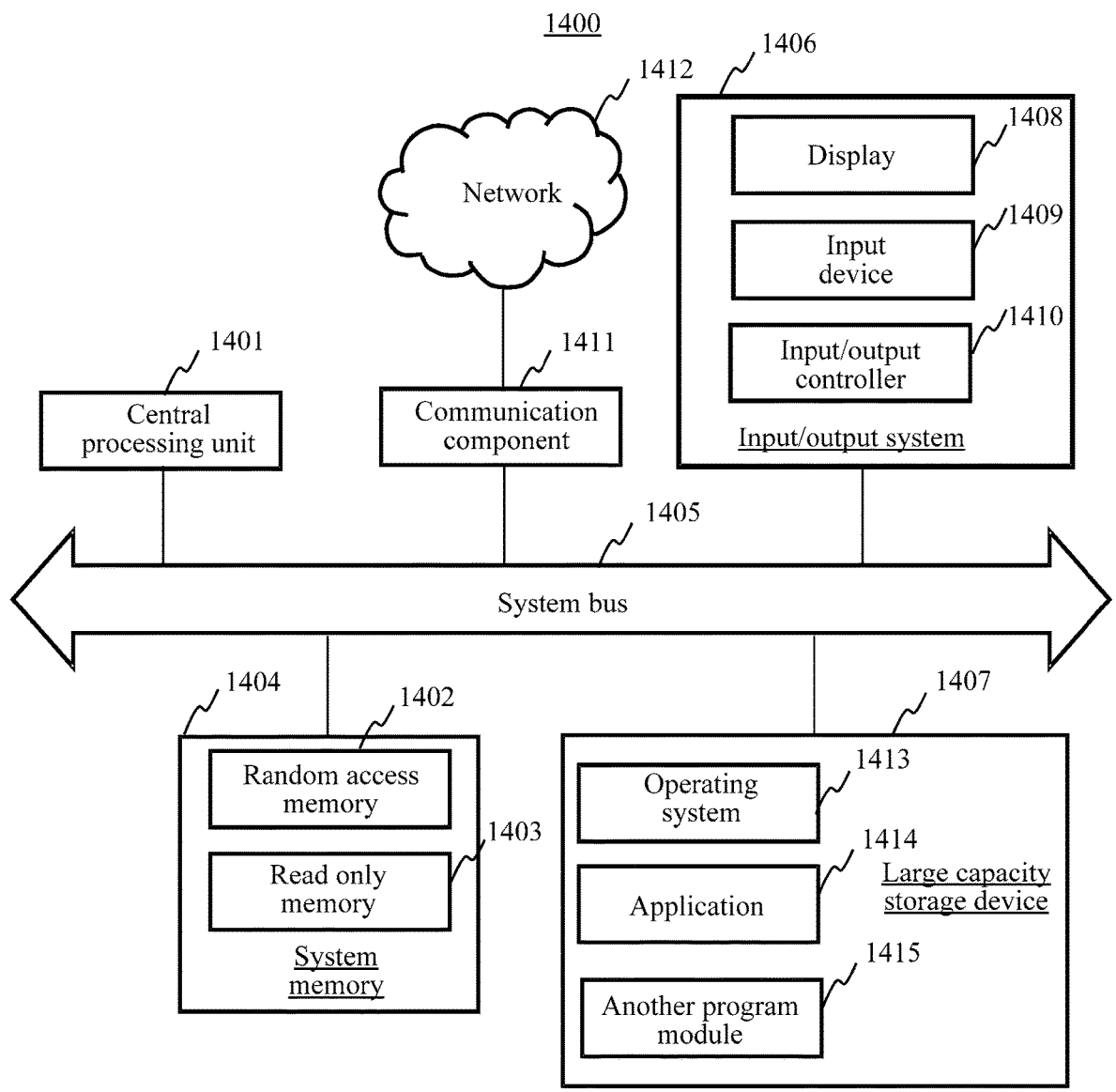
FIG. 14 is a structural block diagram of a server according to another embodiment of the present disclosure.

Referring to FIG. 14, FIG. 14 is a structural block diagram of a server according to some embodiments of the present disclosure. The server 1400 includes a central processing unit (CPU) 1401, a system memory 1404 including a random access memory (RAM) 1402 and a read only memory (ROM) 1403, and a system bus 1405 connecting the system memory 1404 and the central processing unit 1401. The server 1400 further includes a basic input/output system (I/O system) 1406 that helps the devices in the computer transmit information and a large capacity storage device 1407 configured to store an operating system 1413, an application 1414, and another program module 1418.

The basic input/output system 1406 includes a display 1408 configured to display information and an input device 1409, such as a mouse and a keyboard, configured to input information for a user. The display 1408 and the input device 1409 are both connected to the central processing unit 1401 through an input/output controller 1410 connected to the system bus 1405. The basic input/output system 1406 may further include the input/output controller 1410 configured to receive and process inputs from a plurality of other devices such as a keyboard, a mouse, or an electronic stylus. Similarly, the input/output controller 1410 further provides outputs to a display screen, a printer, or an output device of another type.

The large capacity storage device 1407 is connected to the central processing unit 1401 through a large capacity storage controller (not shown) connected to the system bus 1405. The large capacity storage device 1407 and related computer readable media provide a non-volatile memory for the server 1400. That is, the large capacity storage device 1407 may include non-transitory computer readable media (not shown) such as a hard disk or a CD-ROM driver.

Without losing generality, the computer readable media may include computer storage media and a communication medium. The computer storage media include volatile/non-volatile, removable/non-removable media implemented by any method or technology and configured to store information such as computer readable instructions, data structure, program module, or other data. The computer storage media include an RAM, a ROM, an EPROM, an EEPROM, a flash memory or another solid storage technology, a CD-ROM, a DVD or another optical memory, a cassette, a magnetic tape, or a magnetic disk memory or another magnetic storage device. Certainly, it can be learned by a person of ordinary skill in the art that the computer storage media are not limited to the foregoing several types. The system memory 1404 and the large capacity storage device 1407 may be collectively referred to as memories.

According to the embodiments of the present disclosure, the server 1400 may also be connected to a remote computer on the network for running through a network such as the internet. That is, the server 1400 may be connected to a network 1412 through a communication component 1411 connected to the system bus 1405. Or, the server 1400 may also be connected to a network of another type, or a remote computer system (not shown) by using the communication component 1411.

The memory further includes one or more programs. The one or more programs are stored in the memory and include instructions to be executed by the server in the network access method provided in the embodiments of the present disclosure.

A person skilled in the art of ordinary skill in the art should understand that all or a part of the operations of the network access method in the foregoing embodiments may be implemented by a program instructing relevant hardware. The program may be stored in a non-transitory computer readable storage medium, such as a read only memory (ROM), a random access memory (RAM), a magnetic disk, or an optical disc.

The sequence numbers of the foregoing embodiments of the present disclosure are merely for the convenience of description, and do not imply the preference among the embodiments.

A person of ordinary skill in the art may understand that all or some of the operations of the foregoing embodiments may be implemented by using hardware, or may be implemented by a program instructing relevant hardware. The program may be stored in a non-transitory computer readable storage medium. The storage medium may be a read only memory, a magnetic disk, an optical disc, or the like.

The foregoing descriptions are merely embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A network access method performed at a computer server in connection with a social networking platform, wherein the social networking platform is associated with a first social networking account and a second social networking account, the computer server having one or more processors and memory storing one or more programs for execution by the one or more processors, the method comprising:
    receiving a binding instruction sent by the second social networking account at a second terminal, the binding instruction carrying information of the second social networking account, an identifier of a wireless network, and authorization information of the wireless network;
    binding the second social networking account, the identifier of the wireless network, and the authorization information of the wireless network according to the binding instruction;
    after the binding,
        receiving a network access request sent by the first social networking account at a first terminal to the second social networking account at the second terminal, the network access request including a message sent by the first terminal to access the wireless network bound to the second social networking account;
        forwarding the network access request including the message to the second social networking account, the network access request including the first social networking account and an identifier of the wireless network;
        receiving a feedback instruction sent by the second social networking account; and
        sending authorization information of the wireless network to the first social networking account in accordance with a determination that the feedback instruction is an access authorization instruction, the authorization information including verification information used for accessing the wireless network.

2. The method according to claim 1, wherein the binding instruction further includes a location of the wireless network and the network access request includes a location of the first terminal and the method further comprises: denying the network access request in accordance with a determination that the location of the first terminal is outside a predefined range of the location of the wireless network.

3. The method according to claim 1, further comprising:
    before receiving the network access request:
        providing the second social networking account bound to the wireless network to the first terminal when the first social networking account is within an open range of the second social networking account, wherein
        the open range comprises: open to a selected social networking account, or, open to a social networking account having a predetermined attribute, or, open to a social networking account having a social relation, or, open to all social networking accounts; and the predetermined attribute comprises at least one attribute of gender, age, education, place, hobbies, and personal experience.

4. The method according to claim 1, further comprising:
after sending the authorization information of the wireless network to the first social networking account:
receiving first social networking information that is sent by the first social networking account to the second social networking account, and forwarding the first social networking information to the second terminal; and
receiving second social networking information that is sent by the second social networking account to the first social networking account, and forwarding the second social networking information to the first terminal.

5. The method according to claim 1, further comprising:
periodically collecting statistics about first data, the first data comprising at least one of a duration for which the first terminal is connected to the wireless network and data of traffic used by the first terminal after accessing the wireless network; and
transferring a first resource from a first resource account corresponding to the first social networking account to a second resource account corresponding to the second social networking account according to the first data.

6. The method according to claim 1, further comprising:
before forwarding the network access request to the second social networking account:
determining a relationship between the first social networking account and the second social networking account at the social networking platform;
in accordance with a determination that the first social networking account is a direct contact of the second social networking account at the social networking platform, sending the authorization information of the wireless network to the first social networking account without waiting for the feedback instruction from the second social networking account;
in accordance with a determination that the first social networking account and the second social networking account are members of a group chat at the social networking platform, including an identity of the group chat in the network access request to be sent to the second social networking account; and
in accordance with a determination that the first social networking account and the second social networking account are not members of any group chat at the social networking platform, sending a connection invitation to the second social networking account, the connection invitation including the first social networking account and the identifier of the wireless network.

7. The method according to claim 6, further comprising:
after sending the connection invitation to the second social networking account:
receiving a response from the second social networking account, the response indicating that the second social networking account grants the network access request; and
in accordance with a determination that the second social networking account grants the network access request, establishing a direct contact relationship between the first social networking account and the second social networking account at the social networking platform.

8. A computer server in connection with a social networking platform, wherein the social networking platform is associated with a first social networking account and a second social networking account, the computer server having one or more processors, memory, and one or more programs stored in the memory that, when executed by the one or more processors, cause the computer server to perform a plurality of operations including:
receiving a binding instruction sent by the second social networking account at a second terminal, the binding instruction carrying information of the second social networking account, an identifier of a wireless network, and authorization information of the wireless network;
binding the second social networking account, the identifier of the wireless network, and the authorization information of the wireless network according to the binding instruction;
after the binding,
receiving a network access request sent by the first social networking account at a first terminal to the second social networking account at the second terminal, the network access request including a message sent by the first terminal to access the wireless network bound to the second social networking account;
forwarding the network access request including the message to the second social networking account, the network access request including the first social networking account and an identifier of the wireless network;
receiving a feedback instruction sent by the second social networking account; and
sending authorization information of the wireless network to the first social networking account in accordance with a determination that the feedback instruction is an access authorization instruction, the authorization information including verification information used for accessing the wireless network.

9. The computer server according to claim 8, wherein the binding instruction further includes a location of the wireless network and the network access request includes a location of the first terminal and the method further comprises: denying the network access request in accordance with a determination that the location of the first terminal is outside a predefined range of the location of the wireless network.

10. The computer server according to claim 8, wherein the plurality of operations include:
before receiving the network access request:
providing the second social networking account bound to the wireless network to the first terminal when the first social networking account is within an open range of the second social networking account, wherein
the open range comprises: open to a selected social networking account, or, open to a social networking account having a predetermined attribute, or, open to a social networking account having a social relation, or, open to all social networking accounts; and the predetermined attribute comprises at least one attribute of gender, age, education, place, hobbies, and personal experience.

11. The computer server according to claim 8, wherein the plurality of operations include:

after sending the authorization information of the wireless network to the first social networking account:
receiving first social networking information that is sent by the first social networking account to the second social networking account, and forwarding the first social networking information to the second terminal; and
receiving second social networking information that is sent by the second social networking account to the first social networking account, and forwarding the second social networking information to the first terminal.

12. The computer server according to claim 8, wherein the plurality of operations include:
periodically collecting statistics about first data, the first data comprising at least one of a duration for which the first terminal is connected to the wireless network and data of traffic used by the first terminal after accessing the wireless network; and
transferring a first resource from a first resource account corresponding to the first social networking account to a second resource account corresponding to the second social networking account according to the first data.

13. The computer server according to claim 8, wherein the plurality of operations include:
before forwarding the network access request to the second social networking account:
determining a relationship between the first social networking account and the second social networking account at the social networking platform;
in accordance with a determination that the first social networking account is a direct contact of the second social networking account at the social networking platform, sending the authorization information of the wireless network to the first social networking account without waiting for the feedback instruction from the second social networking account;
in accordance with a determination that the first social networking account and the second social networking account are members of a group chat at the social networking platform, including an identity of the group chat in the network access request to be sent to the second social networking account; and
in accordance with a determination that the first social networking account and the second social networking account are not members of any group chat at the social networking platform, sending a connection invitation to the second social networking account, the connection invitation including the first social networking account and the identifier of the wireless network.

14. The computer server according to claim 13, wherein the plurality of operations include:
after sending the connection invitation to the second social networking account:
receiving a response from the second social networking account, the response indicating that the second social networking account grants the network access request; and
in accordance with a determination that the second social networking account grants the network access request, establishing a direct contact relationship between the first social networking account and the second social networking account at the social networking platform.

15. A non-transitory computer readable storage medium storing one or more programs that, when executed by one or more processors of a computer server in connection with a social networking platform, wherein the social networking platform is associated with a first social networking account and a second social networking account, cause the computer server to perform a plurality of operations including:
receiving a binding instruction sent by the second social networking account at a second terminal, the binding instruction carrying information of the second social networking account, an identifier of a wireless network, and authorization information of the wireless network;
binding the second social networking account, the identifier of the wireless network, and the authorization information of the wireless network according to the binding instruction;
after the binding,
receiving a network access request sent by the first social networking account at a first terminal to the second social networking account at the second terminal, the network access request including a message sent by the first terminal to access the wireless network bound to the second social networking account;
forwarding the network access request including the message to the second social networking account, the network access request including the first social networking account and an identifier of the wireless network;
receiving a feedback instruction sent by the second social networking account; and
sending authorization information of the wireless network to the first social networking account in accordance with a determination that the feedback instruction is an access authorization instruction, the authorization information including verification information used for accessing the wireless network.

16. The non-transitory computer readable storage medium according to claim 15, wherein the binding instruction further includes a location of the wireless network and the network access request includes a location of the first terminal and the method further comprises: denying the network access request in accordance with a determination that the location of the first terminal is outside a predefined range of the location of the wireless network.

17. The non-transitory computer readable storage medium according to claim 15, wherein the plurality of operations include:
before receiving the network access request:
providing the second social networking account bound to the wireless network to the first terminal when the first social networking account is within an open range of the second social networking account, wherein
the open range comprises: open to a selected social networking account, or, open to a social networking account having a predetermined attribute, or, open to a social networking account having a social relation, or, open to all social networking accounts; and the predetermined attribute comprises at least one attribute of gender, age, education, place, hobbies, and personal experience.

* * * * *